United States Patent [19]

Nouet

[11] 4,426,587
[45] Jan. 17, 1984

[54] POWER SUPPLY DISTRIBUTION SYSTEM

[75] Inventor: Christian Nouet, Ste Geneviève des Bois, France

[73] Assignee: Societe Anonyme dite: Compagnie Industrielle des Telecommunications Cit-Alcatel, Paris, France

[21] Appl. No.: 396,579

[22] Filed: Jul. 9, 1982

[30] Foreign Application Priority Data

Jul. 10, 1981 [FR] France .................................. 81 13645

[51] Int. Cl.³ ............................................ G05D 23/00
[52] U.S. Cl. ........................................ 307/66; 307/23; 307/150
[58] Field of Search ................... 307/11, 23, 42, 46, 307/48, 64, 66, 149, 150, 154, 155, 156

[56] References Cited

U.S. PATENT DOCUMENTS

| | | | |
|---|---|---|---|
| 3,949,238 | 4/1976 | Brookes | 307/23 X |
| 4,065,711 | 12/1977 | Kawabata | 307/66 X |
| 4,181,842 | 1/1980 | Elias et al. | 307/66 |
| 4,313,060 | 1/1982 | Fickenscher et al. | 307/23 |

OTHER PUBLICATIONS

Proceedings of the National Electronics Conference, vol. 31, 1977, Oak Brook, Illinois (US) Hunter: A Modular DC Converter Power Plant, Concept for Large Electronic Telephone Systems, pp. 106–111.

*Primary Examiner*—Elliot A. Goldberg
*Assistant Examiner*—Derek Jennings
*Attorney, Agent, or Firm*—Sughrue, Mion, Zinn, Macpeak, and Seas

[57] ABSTRACT

The power supply system comprises three levels: a primary level (PRI), a secondary level (SEC), and a tertiary level (TER). The secondary level is constituted by power supply circuits (S1 to Sn) which provide galvanic isolation between the primary and the tertiary levels, and which provide at least one intermediate voltage at a fixed level relative to a system reference potential (point R). The tertiary level comprises chopper power supplies (RD), converters (CV), and inverters (OND) connected to user equipment (UT).

14 Claims, 6 Drawing Figures

POWER SUPPLY DISTRIBUTION SYSTEM

The present invention relates to a power supply system for distributing electrical power to electronic assemblies. It is mainly applicable to the electronics, telecommunications and computer industries, and is particularly intended for distributing power in telecommunications exchanges.

BACKGROUND OF THE INVENTION

Electronic assemblies are becoming ever more reliable in themselves, and therefore they require completely uninterruptible power supplies if this reliability is to be exploited.

There are parallel requirements for increasingly modular power supplies that are as versatile as possible as well as being highly efficient.

A first stage consists in improving the performance of primary sources of power. For example, the Applicants' French patent application No. 80 05141 for "A power distribution system for electronic assemblies" describes a power distribution system in which the primary power supplies are standardised and do not need to be regulated.

Also, particularly in telecommunications exchanges, equipment has been decentralised by supplying the racks directly with AC mains, thereby reducing the cost of transporting the electricity to its point of use while increasing modularity.

However, such decentralisation leads to an increase in the amount of equipment required at the secondary level, i.e. at rack level, thereby losing space and also losing a part of the advantages of modularity wherever the network is backed-up by a centralized emergency power supply. There is thus a requirement for a back-up supply system that is likewise modular.

Preferred embodiments of the present invention reduce the above mentioned drawbacks and can also greatly increase efficiency in the installation as a whole.

SUMMARY OF THE INVENTION

The present invention provides a power supply distribution system, in particular for an exchange comprising electronic user equipments which are powered at low voltage with electricity derived from a high voltage AC network, and with the user equipments being disposed in racks and with groups of the racks being fed with high voltage directly from a primary distribution system connected to said network, wherein the said racks and groups of racks include a secondary level of power supplies which provide galvanic isolation from the primary system and which deliver power at at least one intermediate fixed voltage relative to an installation reference potential to a third level of power supplies which are connected directly to said user equipment.

If the supply system is backed-up by a DC supply, a single distribution line can be used to distribute the available power, regardless of whether it is AC or DC.

The secondary power supplies can be coupled to back each other up via diode coupling circuits which preferably use Schottky diodes to minimise power losses in the coupling circuits.

The secondary power supplies may also be locally backed-up by small rechargeable batteries and their associated charging means. This can be cheaper than a centralized battery back-up system if a generator is used as the main emergency power supply, such that the rechargeable batteries are only required to tide the secondary power supplies over the time taken to start up the generator. It also increases modularity, in that each secondary power supply is fitted with the battery back-up that it requires.

BRIEF DESCRIPTION OF THE DRAWINGS

Embodiments of the invention are described by way of example with reference to the accompanying drawings, in which.

MORE DETAILED DESCRIPTION

A power supply distribution system in accordance with the invention comprises three power supply levels between user equipment and/or sub-assemblies UT, and a point which is connected directly to the mains RA. The three levels comprise a primary level PRI, a secondary level SEC, and a tertiary level TER.

The primary level comprises distribution means connected to the AC mains RA and to an emergency power supply GS. In particular it comprises a distribution chest ARD having respective inputs connected to the AC mains RA and to the emergency power supply GS, and having an output connected to the second level SEC by a distribution line LD.

At the secondary level there is one power supply (S1 to Sn) per assembly of user equipment, where an assembly may comprise one or two racks depending the nature of the equipment housed in the rack(s). This is the level that provides galvanic isolation between the power supply network and the end use. The power supplies themselves may be constituted by converters, transformers, etc. In the application shown in FIG. 1, the emergency supply GS is constituted by a source of DC at high tension comprising a battery of secondary cells connected to the mains via rectifiers for re-charging. In such a case, the secondary level is equipped with dual purpose converters having inputs which are capable of accepting power in AC or in DC. A single distribution line LD is then sufficient for conveying AC under normal conditions and DC when there is a power cut, with the DC coming from the emergency battery GS. In many applications, the secondary sources S1 to Sn are mainly converters having DC outputs. It is preferable to choose a single output voltage to enable the equipment to be as standardised as possible and to enable common emergency supplies to be used.

Voltages higher than the said single voltage can be obtained by coupling supplies in series, as explained below, and lower voltages can be obtained by regulation at the tertiary level TER.

Figure 1:
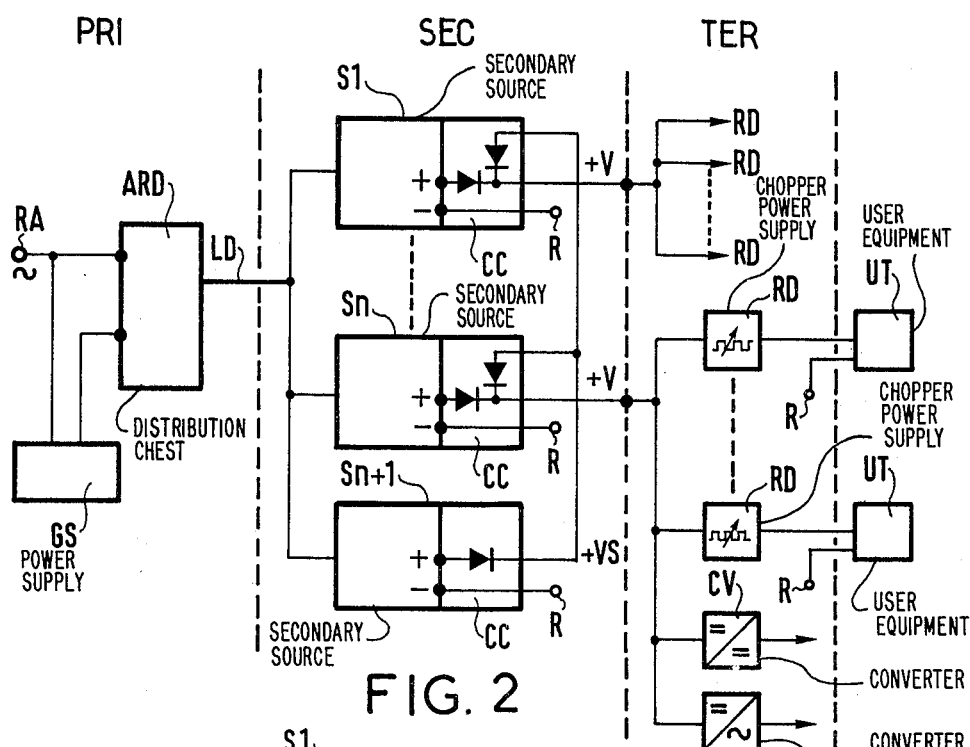
FIG. 1 is a block diagram of a power supply system in accordance with the invention.

In the circuit shown in FIG. 1, a secondary power supply provides a positive voltage $+V$ via a diode coupling circuit CC. The negative pole of the supply is connected to a point R at the system reference voltage (logical level zero). This arrangement enables n identical secondary power supplies S1 to Sn to be backed up one or more p emergency power supplies Sn+1 also at the secondary level by parallel connections as shown in FIG. 1.

The tertiary level TER comprises power supplies that are not isolated, e.g. chopper power supplies RD providing output voltages that vary as a function of pulse width. Other tertiary supplies may also be provided such as converters CV or inverters OND.

The user equipments or sub-assemblies UT are connected to the outputs from the tertiary level power supplies and to the reference voltage point R. Naturally, if the sub-assemblies are complex, there could be a fourth power supply level: for example, the secondary power supply could deliver +24 V, the tertiary power supply +12 V, and a fourth level of output converters could supply −12 V, +5 V, −5 V, etc.

Figure 2:
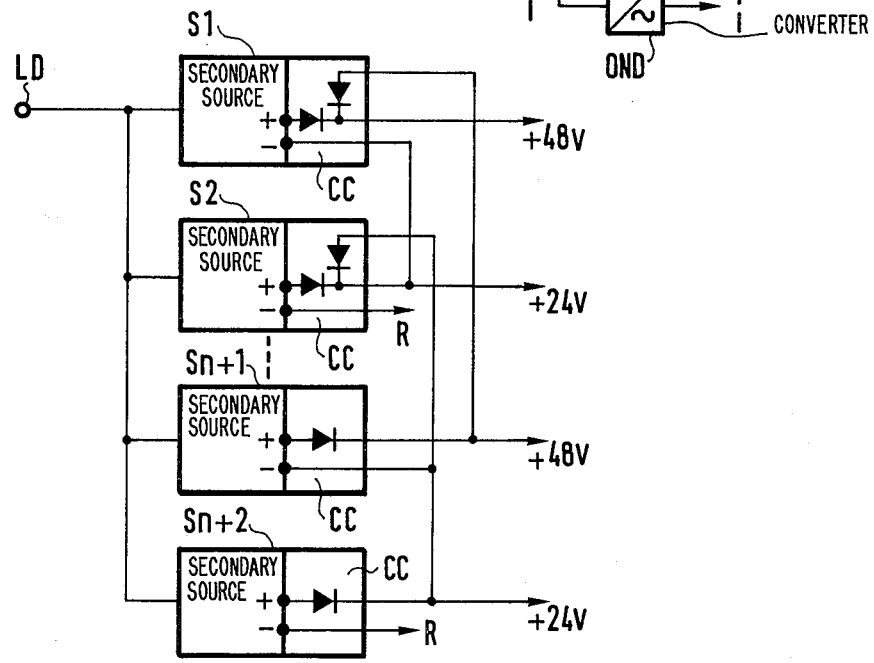
FIG. 2 is a block diagram of a variant of a secondary level power supply shown in FIG. 1.

In the example shown in FIG. 2, secondary supplies delivering 24 V are also used. A 48 V supply is obtained by coupling two 24 V supplies in series. The same arrangement is used for the emergency supplies Sn+1 and Sn+2.

The choice of 24 V for the secondary level enables Schottky diodes to be used in the coupling circuits CC which is advantageous in that Schottky diodes have a low forward voltage drop, and thereby improve the efficiency of the power supply.

A power supply system in accordance with the invention makes it possible to use an emergency generator set at the primary level on its own without using a battery of cells and rectifiers which are expensive and take up a lot of room. This can be done by providing each secondary supply with an emergency back-up battery. Supposing that the emergency generator can be relied on to cut in rapidly on mains power failing, the secondary level batteries need only be of short endurance, say 15 minutes. Thus the combination of a primary level generator and secondary level batteries can be considerably cheaper and more compact than relying on primary level batteries alone.

Figure 3:
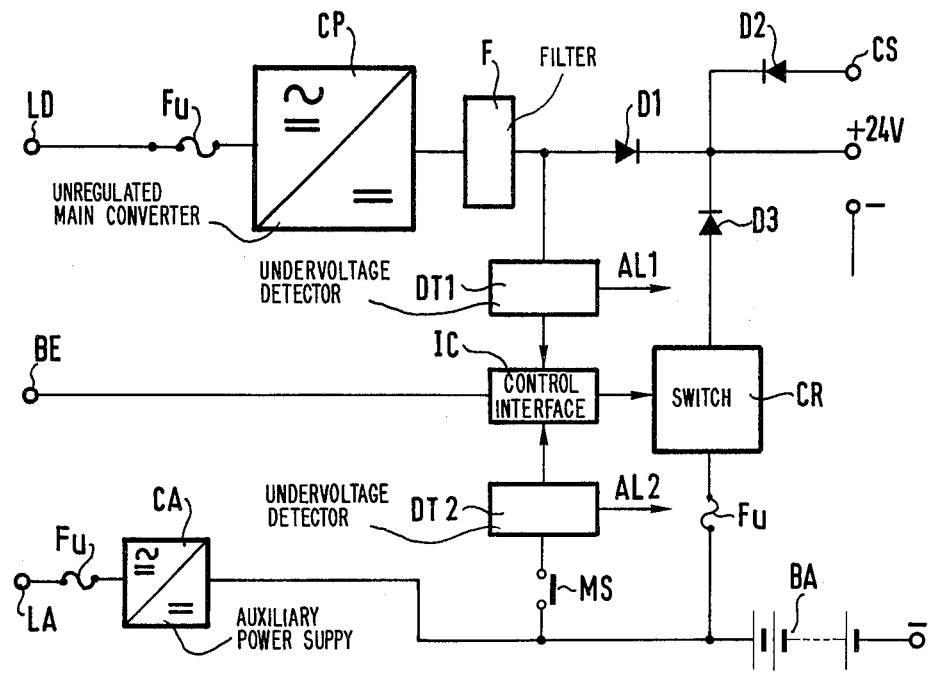
FIG. 3 is a block diagram of a secondary level power supply with a back-up battery operated under remote control.

FIG. 3 shows a secondary power supply backed-up by a low capacity battery. The distribution line LD is connected to an unregulated main converter CP having an output supplying +24 V DC via a filter F and a diode D1. A diode D2 enables emergency power to be supplied by another secondary power supply connected to an input CS.

A battery BA is also connected to the +24 V output via a switch CR and a decoupling diode D3. The switch serves to switch the battery in and out of service.

The battery is charged and kept charged by an auxiliary power supply CA, e.g. a regulated low power converter, powered from the distribution chest ARD via an auxiliary line LA. Naturally the characteristics of use of the lines LA and LD could be the same. In such a case a single line would be used to power both the main converters CP and the auxiliary converters CA. The circuit also includes under-voltage detectors DT1 and DT2 which supply alarm signals AL1 and AL2 when the voltage drops below a predetermined threshold. The detector DT1 monitors the output voltage from the main converter CP while the detector DT2 monitors the battery voltage. A manual switch MS enables the battery to be taken out of service. Further the circuits are protected by fuses FU. The circuit shown in FIG. 3 is also capable of having the secondary level power supply under remote control. To provide optimum control of all the seconday level power supplies, it is advantageous to centralized data about their operation and to provide a computer to control them as a function of that data.

In particular, remote control can be used to ensure that the battery BA is only used under certain specified conditions: for example it is pointless to discharge the battery when it is short circuited by the main converter, or in many other kinds of fault if the main converter is adequately backed-up by another converter.

The circuit includes a control interface IC connected to a central controller (not shown) via a data interchange bus BE. The interface IC controls the switch CR. It is also connected to the detectors DT1 and DT2. For example, the interface may comprise a switch control circuit and a scanner circuit arranged to enable the controller to read any of the following data:
 switch position;
 state of the detectors;
 state of the fuses; and
 digital data provided by measuring circuits (not shown) for measuring input and output current flows, current being drawn from the battery, current being drawn from the emergency secondary power supply connected to the point CS, etc.

The switch control circuit could be constituted by a bistable and a decision circuit which takes into account the state of the detectors and an enable signal supplied via the bus BE.

The invention can also be applied to installations using a mixture of low voltage assemblies and high voltage assemblies operating at 220 or 380 V AC. This happens in telecommunications exchanges which include computer peripherals.

Figure 4:
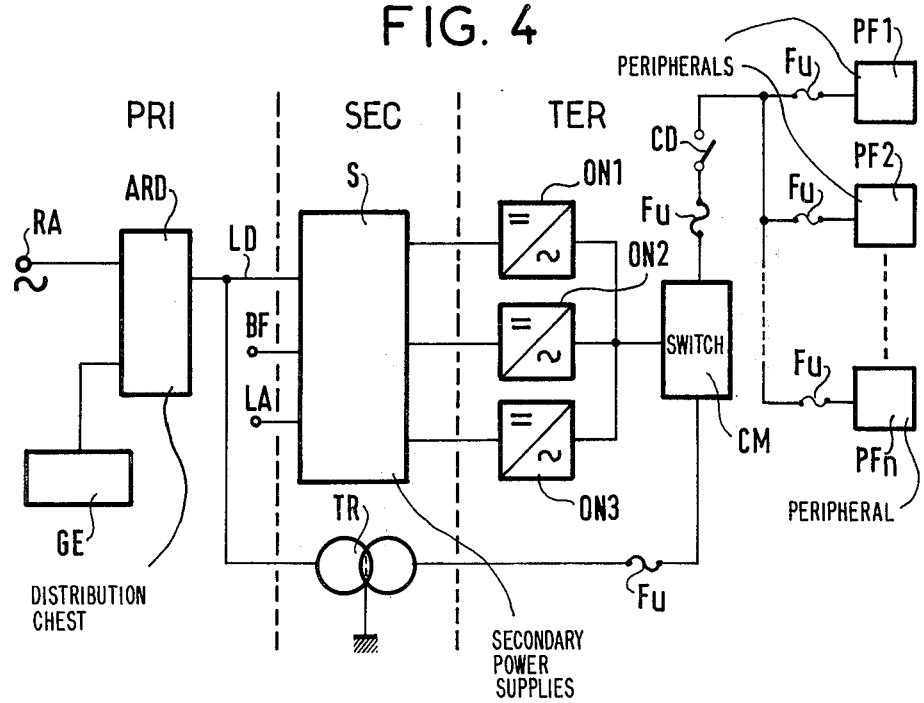
FIG. 4 is a block diagram of a power supply system for computer peripherals.

Such an application is shown in FIG. 4.

Peripherals PF1 to PFn have two power supplies:
 a first supply via inverters (ON1 to ON3) themselves powered by a set of secondary power supplies S; and
 a second power supply via a screened transformer TR connected to the distribution chest ARD.

Depending on the conditions under which the peripherals are used, and the power they require compared with the total power requirements of the installation, one or other of said power supplies can usefully act as the main power supply, with the other acting as the back-up. Switching from one supply to another is performed by a switch CM. The peripherals are under the control of a main on/off switch CD.

For example, the secondary power supply may be of the type shown in FIG. 2 and capable of supplying a backed-up 48 V. Each secondary power supply may also be backed-up by an internal battery as shown in FIG. 3.

Although, the decentralised power supply system described above is particularly intended for use in exchanges of modular and decentralised structure, it is also applicable to other types of existing installation.

Figure 5:
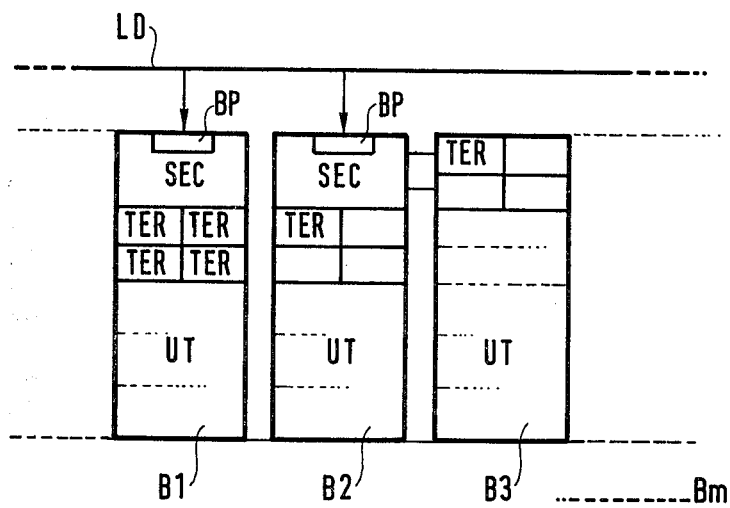
FIG. 5 shows an application of the invention to individually powered racks.

FIG. 5 shows the system installed in a modular installation.

User equipments UT requiring power supply are arranged in racks B1 to Bm in an optimal manner depending on the capacity of the system.

Supposing that a standard secondary power supply is available, some of the racks could require one secondary supply per rack, while other racks might only need one secondary supply between two racks.

In the example shown, the distribution line LD arrives at the top via a protected cabinet BP which is inaccessible to personnel normally working on the installation.

Figure 6:
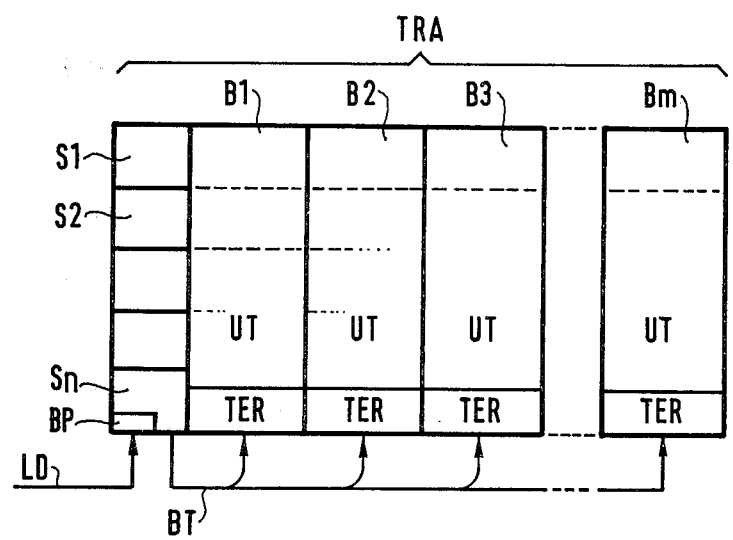
FIG. 6 shows an application of the invention to racks powered in banks.

FIG. 6 shows an application to an exchange having a centralized power distribution system and racks of equipment arranged in banks TRA. At the end of each bank there is a power distribution module serving the entire bank. In accordance with the invention said modules are replaced with secondary level power supplies, while the tertiary level power supplies are located in the racks themselves. This means that distribution means in an existing installation can be replaced without requiring a great deal of modification. In particular, the converters previously used in the racks can be retained as tertiary level power supplies.

FIG. 6 shows the case where the distribution line LD and the low voltage line BT between the secondary and tertiary levels are passed under a false floor.

Another advantage of a decentralised system, which can be seen in FIG. 4, comes from the independance of the secondary power supplies. Disruption caused by a breakdown in one equipment do not propagate. Further, voltage surges due to the operation of some kinds of apparatus, e.g. the computer peripherals PF, are greatly reduced.

I claim:

1. A power supply distribution system, in particular for an exchange comprising electronic user equipments which are powered at low voltage with electricity derived from a high voltage AC network, and with the user equipments being disposed in racks and with groups of the racks being fed with high voltage directly from a primary distribution system connected to said network, wherein the said racks and groups of racks include a secondary level of power supplies which provide galvanic isolation from the primary system and which deliver power at at least one intermediate fixed voltage relative to an installation reference potential to a third level of power supplies which are connected directly to said user equipment.

2. A power supply system according to claim 1, wherein the primary distribution system is backed-up by an emergency supply of high voltage DC, and wherein the secondary level power supplies are capable of being powered by AC or by DC, the primary level distribution system being connected to the secondary level power supplies by a single distribution line which normally conveys network AC, but which also serves to convey DC from the emergency supply in the event of a failure in the AC.

3. A power supply system according to claim 1, wherein the secondary level power supplies comprise at least one standardised type of power supply for supplying a specific secondary direct voltage, and wherein said standardised type power supplies are arranged in modules of at least two of said standardised supplies coupled to feed a common output via respective diodes in a coupling circuit.

4. A power supply system according to claim 3, wherein the coupling circuit is composed of Schottky type diodes.

5. A power supply system according to claim 3, wherein a plurality p of emergency power supplies are connected in parallel with a plurality n normal secondary power supplies.

6. A power supply system according to claim 3, wherein at least one of the secondary power supplies is backed-up by a battery.

7. A power supply system according to claim 6, wherein the battery is charged via an auxiliary power supply that provides galvanic isolation.

8. A power supply system according to claim 6, wherein the battery is connected to said coupling circuit via an electronic switch.

9. A power supply system according to claim 6, wherein the output voltages from the secondary level power supplies and from the secondary level back-up battery are independently monitored by respective threshold detectors which give an alarm signal if the monitored voltages drop below a fixed threshold.

10. A power supply system according to claim 8, wherein at least one of the level secondary power supplies includes an interface connected to an interchange bus to receive remote control signals, said interface including means for controlling said switch and means for emitting on the interchange bus data concerning the various components of the secondary level power supply.

11. A power supply system according to claim 3, comprising both user equipments which need to be powered at low voltage and user equipments which need to be powered at high voltage and which are capable of being powered from two different power supplies selected by a switch, wherein one of said two different power supplies is constituted by a set secondary level power supplies associated with a set of inverters.

12. A power supply system according to claim 1, wherein the tertiary level power supply are constituted by chopper circuits.

13. A power supply system according to claim 1, for a modular installation wherein the racks and groups of racks are separately powered by the primary distribution system, and wherein each rack or group of racks includes its own secondary power supply.

14. A power supply system according to claim 1, for an installation wherein the racks are organised in banks each of which is powered by means located at one end of the bank, and wherein said means at one end of a bank is constituted by a secondary level power supply, itself receiving power from the primary level via a distribution line and delivering power via a low voltage line to the tertiary level power supplies which are installed in the same racks as the equipment they power.

* * * * *